(12) United States Patent
Finzi et al.

(10) Patent No.: US 10,366,217 B2
(45) Date of Patent: Jul. 30, 2019

(54) CONTINUOUS USER AUTHENTICATION

(71) Applicant: SECUREDTOUCH LTD., Tel-Aviv (IL)

(72) Inventors: Yair Finzi, Tel-Aviv (IL); Ran Shulkind, Givatayim (IL)

(73) Assignee: SECUREDTOUCH LTD., Tel Aviv (IL)

( * ) Notice: Subject to any disclaimer, the term of this patent is extended or adjusted under 35 U.S.C. 154(b) by 0 days.

(21) Appl. No.: 15/561,993

(22) PCT Filed: Mar. 29, 2016

(86) PCT No.: PCT/IB2016/051764
§ 371 (c)(1),
(2) Date: Sep. 27, 2017

(87) PCT Pub. No.: WO2016/157075
PCT Pub. Date: Oct. 6, 2016

(65) Prior Publication Data
US 2018/0068098 A1 Mar. 8, 2018

Related U.S. Application Data

(60) Provisional application No. 62/139,737, filed on Mar. 29, 2015.

(51) Int. Cl.
*G06F 21/31* (2013.01)
*G06F 3/048* (2013.01)
(Continued)

(52) U.S. Cl.
CPC ............ *G06F 21/316* (2013.01); *G06F 3/048* (2013.01); *G06F 21/31* (2013.01); *H04L 9/321* (2013.01);
(Continued)

(58) Field of Classification Search
None
See application file for complete search history.

(56) References Cited

U.S. PATENT DOCUMENTS 9,465,368 B1 * 10/2016 Mitter ...................... G05B 1/00
2007/0236330 A1 10/2007 Cho et al.
(Continued)

FOREIGN PATENT DOCUMENTS

WO 20140142947 9/2014

OTHER PUBLICATIONS

International Search Report in PCT/IB2016/051764 dated Jul. 12, 2016.
(Continued)

*Primary Examiner* — Kambiz Zand
*Assistant Examiner* — Arezoo Sherkat
(74) *Attorney, Agent, or Firm* — Manelli Selter PLLC; Edward J. Stemberger (57) ABSTRACT

A method of enabling continuous user authentication, comprising: setting up an authentication server to provide authentication data to an enterprise server in parallel to a remote user session with the enterprise server, when the user is using a touch screen device; extracting samples from a user's behavior, to build a library of user specific parameters; and tracking user behavior to authenticate the user, the tracking comprises initial identification of a user of the touch screen device when starting a session with the enterprise server and continuous authentication of the user during the session with the enterprise server.

47 Claims, 3 Drawing Sheets

(51) Int. Cl.
*H04L 9/32* (2006.01)
*H04W 12/06* (2009.01)
*H04L 29/08* (2006.01)
*G06F 3/0488* (2013.01)

(52) U.S. Cl.
CPC .......... *H04L 9/3226* (2013.01); *H04L 9/3234* (2013.01); *H04L 67/22* (2013.01); *H04L 67/306* (2013.01); *H04W 12/06* (2013.01); *G06F 3/04883* (2013.01); *H04L 67/14* (2013.01); *H04M 2250/22* (2013.01)

(56) References Cited

U.S. PATENT DOCUMENTS

| | | | |
|---|---|---|---|
| 2010/0115610 A1 | 5/2010 | Tredoux et al. | |
| 2012/0054057 A1 | 3/2012 | O'Connell et al. | |
| 2013/0102283 A1 | 4/2013 | Lau et al. | |
| 2013/0124315 A1* | 5/2013 | Doughty | G06Q 30/0269 705/14.53 |
| 2013/0160087 A1* | 6/2013 | Davis | H04L 67/22 726/4 |
| 2013/0269013 A1* | 10/2013 | Parry | H04L 63/0861 726/7 |
| 2013/0288647 A1* | 10/2013 | Turgeman | H04W 12/06 455/411 |
| 2014/0310804 A1 | 10/2014 | Apostolos et al. | |
| 2014/0337243 A1* | 11/2014 | Dutt | G06Q 50/265 705/325 |
| 2014/0337621 A1* | 11/2014 | Nakhinnov | G06F 1/163 713/168 |
| 2014/0344927 A1* | 11/2014 | Turgeman | H04W 12/06 726/22 |
| 2015/0035643 A1 | 2/2015 | Kursun | |
| 2015/0066762 A1* | 3/2015 | Chatterton | G06Q 20/40 705/44 |
| 2015/0168174 A1* | 6/2015 | Abramson | G01C 21/3697 701/408 |
| 2016/0063503 A1* | 3/2016 | Kobres | G06F 21/316 705/18 |
| 2016/0197918 A1* | 7/2016 | Turgeman | G06F 21/31 726/4 |
| 2016/0262017 A1* | 9/2016 | Lavee | G06F 21/31 |
| 2016/0294813 A1* | 10/2016 | Zou | H04L 63/0815 |
| 2017/0195356 A1* | 7/2017 | Turgennan | H04L 63/1425 |
| 2018/0027006 A1* | 1/2018 | Zimmermann | H04L 63/0245 726/11 |

OTHER PUBLICATIONS

Frank M et al: "Touchalytics: On the applicability of touchscreen input as a behavioral biometric for continuous authentication" IEEE Transactions on Infornation Forensics and Security, IEEE, Piscataway, NJ, US, vol. 8, No. 1, Jan. 1, 2013 (Jan. 1, 2013), pp. 136-148, XP011487920, ISSN: 1556-6013, DOI: 10.1109/TIFS.2012. 2225048.

Yuxin Meng et al: "Touch gestures based biometric authentication scheme for touchscreen mobile phone", Nov. 28, 2012 (Nov. 28, 2012), Information security and cryptology, springer Berlin Heidelberg, Berlin, Heidelberg, pp. 331-350, XP047028058, ISBN: 978-3-642-38518-6 p. 6-p. 16.

Deutschmann Ingo et al: "Continuous authentication using behavioral biometrics", IT Professional, IEEE Service Center (Jul. 1, 2013), pp. 12-15, Xpo11525000, ISSN: 1520-9202, DOI: 10.1109/ MITP.2013.50.

European Seach Report in EP 16771492.2 dated Feb. 26, 2018.

\* cited by examiner

CONTINUOUS USER AUTHENTICATION

CROSS-REFERENCE TO RELATED PATENT APPLICATIONS

This patent application claims priority from and is related to U.S. Provisional Patent Application Ser. No. 62/139,737, filed Mar. 29, 2015, this U.S. Provisional Patent Application incorporated by reference in its entirety herein.

FIELD OF THE INVENTION

The present invention generally relates to user authentication and specifically to continuous user authentication on touch screen devices.

BACKGROUND

Mobile touch screen devices continue to grow in popularity and have become an integral part of both personal and business communications. These multi-function devices usually allow, for example, access the Internet via a cellular network and/or a wireless local area network (WLAN).

When using the internet, for example, the mobile touch screen device is exposed to hacking attacks, malware, bots, automated tools, etc. trying to impersonate the user of the touch screen device or make malicious actions in his accounts.

When a user's device is being lost or stolen, for example, the user's accounts are usually connected and exposed to attacks, malicious actions, etc.

There is a need to continuously authenticate the user of the touch screen device in order to prevent such attacks. Moreover, it is desired to reduce the interaction with the user required by existing authentication methods while providing high certainty regarding the user's identity.

There is a long felt need for a system and method for authenticating users of touch screen devices seamlessly, using one or more user's profiles, across devices and across applications.

SUMMARY

According to an aspect of the present invention there is provided a user authentication system, comprising: an authentication server; an enterprise server; and a touch screen device configured to communicate with the enterprise server and the authentication server; the authentication server configured to communicate with the enterprise server and to enable initial identification of a user of the touch screen device when starting a session with the enterprise server and continuous authentication of the user during the session with the enterprise server.

The system may be configured to generate at least one unique user profile.

The system may further be configured to compare the at least one unique user profile with a behavior of the user when starting the session with the enterprise server.

The system may further be configured to compare the at least one unique user profile with a behavior of the user during the session with the enterprise server.

The system may further be configured to continuously update the at least one unique user profile during the session with the enterprise server.

The at least one unique user profile may comprise a plurality of unique user profiles; the system may be configured to generate the plurality of unique user profiles using various indications.

The various indications may be derived using at least one of: accelerometer, gyro, Global Positioning System (GPS), finger location and usage context.

The system may further be configured to generate a super profile using common indications included in each of the plurality of unique user profiles.

The system may be configured to detect an automated tool trying to impersonate touch screen behavior.

The system may comprise an anti replay mechanism configured to perform the detection.

The system may be configured to perform the detection by comparing the user's behavior to at least one hash calculated from previous behaviors of the user.

The system may be configured to perform the detection by one of not receiving expected parameters and not receiving expected parameters values.

The authentication server may comprises: an incoming data handler configured to receive behavior of a user of the touch screen device; a user usage library configured to store users profiles; an analysis system configured to analyze the behavior and at least one profile to authenticate the user; and a data server handler configured to communicate results of the analysis system to the enterprise server.

The system may be configured to perform the initial identification by comparing a behavior of the user to a limited group of profiles related to users that used a touch device having the same device ID in the past.

The system may be configured to perform the initial identification by comparing a location parameter of the user to a limited group of profiles having the same or similar location parameter.

The system may be configured to perform the initial identification by comparing a wireless communication parameter of the user to a limited group of profiles having the same or similar wireless communication parameter.

The system may be configured to perform the initial identification using a unique piece of data assimilated in the user's touch device in a former use.

The authentication server may be configured to enable pre-transaction authentication, without a specific authentication action by the user, in accordance with continuous user behavior tracking.

The system may be configured to execute the continuous authentication seamlessly to the user.

The authentication server may be configured to enable cross platform authentication in accordance with continuous user behavior tracking.

The system may be configured to perform the cross platform authentication by analyzing common parameters collected from at least one former touch screen device of the user and the current touch screen device of the user.

The system may be configured to perform the cross platform authentication by normalizing parameters collected from at least two touch screen devices of the user to a universal device's parameters.

The system may be configured to perform the cross platform authentication by analyzing relative behavior of the user on a former touch device and expecting similar relative behavior of the user on the current touch device.

The system may be configured to perform the cross platform authentication by analyzing a specific user interface frame on a former touch device and expecting similar parameters related to the same frame in the current touch device.

The authentication server may be configured to enable cross application authentication in accordance with continuous user behavior tracking.

The system may be configured to perform the cross application authentication by analyzing common parameters collected from at least one former application used by the user and the current application used by the user.

The system may be configured to perform the cross application authentication by analyzing the user's relative use in a former application and expecting similar relative use in the current application.

The system may be configured to perform the cross application authentication by analyzing a specific user interface frame on a former application and expecting similar parameters related to the same frame in the current application.

According to another aspect of the present invention there is provided a method of building a user profile library, comprising: identifying a user using a touch device; continuously receiving behavior of the user while using the touch device; continuously extracting samples out of the received behavior; generating at least one profile of the user; and storing the at least one profile in the user profile library.

The method may further comprise continuously updating the at least one profile as further behavior is received.

The updating may be done using a number of user behavior sessions.

The updating may be done using a session having a score higher than a predetermined threshold.

The updating may be done using sessions with a strong indication to be related to the user.

The at least one profile may comprise a plurality of profiles.

The generation of the plurality of profiles may be done using at least one of time of day, day, accelerometer, Gyro, operating system indications, location, finger location, usage context and the user's mode.

The user's mode may comprise at least one of walking, running, sleeping and changing hand.

The generation of the plurality of profiles may be done using a group of session, dividing each session into chunks of samples, assigning the chunks to clusters and defining each cluster as a profile.

The generation of the plurality of profiles may be done by assigning sessions into groups of sessions and defining each group of sessions as a profile.

The plurality of profiles may comprise a super profile; the super profile may be generated using common indications included in each of the plurality of profiles.

According to another aspect of the present invention there is provided a method of enabling continuous user authentication, comprising: setting up an authentication server to provide authentication data to an enterprise server in parallel to a remote user session with the enterprise server, when the user is using a touch screen device; extracting samples from a user's behavior, to build a library of user specific parameters; and tracking user behavior to authenticate the user, the tracking comprises initial identification of a user of the touch screen device when starting a session with the enterprise server and continuous authentication of the user during the session with the enterprise server.

The initial identification may comprise comparing the behavior with at least one unique profile of the user when starting a session with the enterprise server.

The continuous authentication may comprise comparing the behavior with at least one unique profile of the user during a session with the enterprise server.

The method may further comprise detecting an automated tool trying to impersonate touch screen behavior.

The detection may be done using an anti replay mechanism.

The detection may comprise comparing the user's behavior to at least one hash calculated from previous behaviors of the user.

The detection may comprise one of not receiving expected parameters and not receiving expected parameters values.

The initial identification may comprise comparing a behavior of the user to a limited group of profiles related to users that used a touch device having the same device ID in the past.

The initial identification may comprise comparing a location parameter of the user to a limited group of profiles having the same or similar location parameter.

The initial identification may comprise comparing a wireless communication parameter of the user to a limited group of profiles having the same or similar wireless communication parameter.

The initial identification may comprise using a unique piece of data assimilated in the user's touch device in a former use.

The method may further comprise performing a pre-transaction authentication, without a specific authentication action by the user, in accordance with continuous user behavior tracking.

The method may be configured to execute the continuous authentication seamlessly to the user.

The method may further comprise performing cross platform authentication in accordance with continuous user behavior tracking.

Performing the cross platform authentication may comprise analyzing common parameters collected from at least one former touch screen device of the user and the current touch screen device of the user.

Performing the cross platform authentication may comprise normalizing parameters collected from at least two touch screen devices of the user to a universal device's parameters.

Performing the cross platform authentication may comprise analyzing relative behavior of the user on a former touch device and expecting similar relative behavior of the user on the current touch device.

Performing the cross platform authentication may comprise analyzing a specific user interface frame on a former touch device and expecting similar parameters related to the same frame in the current touch device.

The method may further comprise performing cross application authentication in accordance with continuous user behavior tracking.

Performing the cross application authentication may comprise analyzing common parameters collected from at least one former application used by the user and the current application used by the user.

Performing the cross application authentication may comprise analyzing the user's relative use in a former application and expecting similar relative use in the current application.

Performing the cross application authentication may comprise analyzing a specific user interface frame on a former application and expecting similar parameters related to the same frame in the current application.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

In the following detailed description, numerous specific details are set forth in order to provide a thorough understanding of the present invention. However, it will be understood by those skilled in the art that the present invention may be practiced without these specific details.

The term "touch screen device" as used herein may encompass smart phones, tablets, smart TVs, watches, appliances, consoles, and other non touch or touch based communication or computing devices, including wearable devices, touch pads, touch mouse's or other interactive surfaces. The term "enterprise server" as used herein may encompass data servers, application servers, specific function servers from enterprises, businesses, organizations, individuals etc., whether in the cloud, on site servers or as a module running on the touch screen device. The term "Application" as used herein may refer to applications on various communication and/or computing devices, on various software platforms, for example wearable devices, vehicle applications, smart phone applications, as well as touch screen device applications in general. The term "cross platform" as used herein may refer to different devices such as smartphone, tablet, etc. or different device types such as for example Samsung™ smartphone and Apple™ smartphone. The terms "behavior", "user behavior" and "touch behavior" as used herein may refer to any usage parameter of the device by the user such as touch parameters, gyro, accelerometer, GPS, Os indications, etc.

Currently, a significant concern of most information security professionals is an enterprise, company or organization's data loss and unauthorized access to their IT systems. For example, while most enterprises already began providing or plan to provide mobile access to internal networks—a new era of enterprise mobility and the Bring Your Own Device (BYOD) trends bring these cyber threats to the mobile plane. Since most passwords are weak and mobile devices exposed to loss, theft and an increasing number of malware—access to enterprises resources and user identity authentication are often the weakest spots for enterprises' security.

Embodiments of the present invention enable continuous user authentication for touch screen devices, by using substantially continuous touch screen usage behavioral analysis during typical user operation of a touch screen device and/or touch screen application, to monitor access to enterprise server resources. Embodiments of the present invention enable collecting data on multiple behavioral parameters relating to touch screen usage, and processing this data to identify specific user identities of device users or application users, to help identify malicious access by unauthorized humans, malware and robots.

Figure 1:
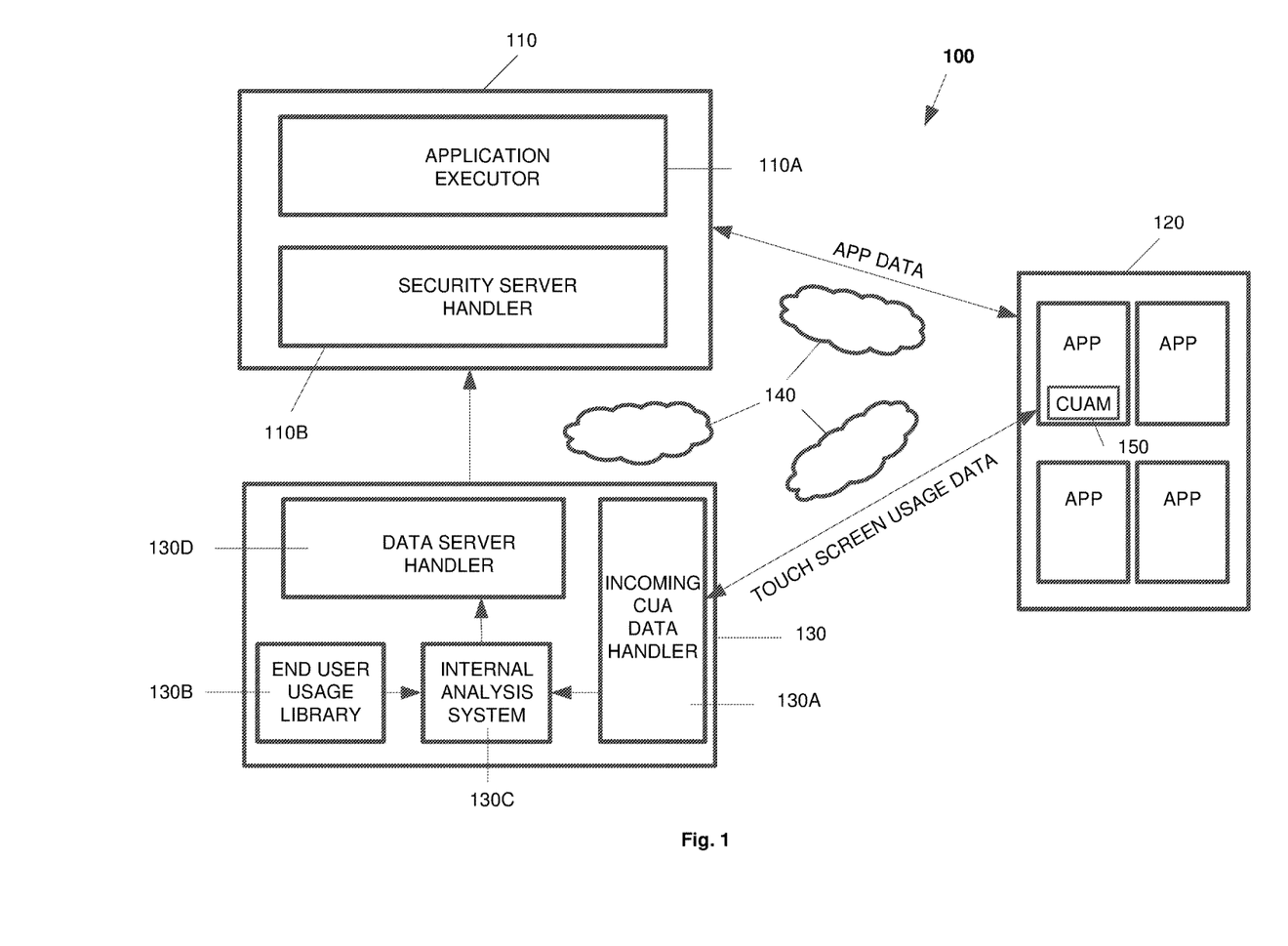
FIG. 1 is a schematic block diagram illustration of a system for enabling Continuous User Authentication (CUA), according to some embodiments.

Reference is now made to FIG. 1 which is a schematic block diagram illustration of a system 100 for enabling continuous user authentication (CUA), according to some embodiments. As can be seen in FIG. 1, the CUA system 100 may include an enterprise server 110, serving data to remote users using touch screen devices 120, and an authentication server 130, to enable continuous user authentication for device users, via a communications network 140, such as a data Cloud, substantially in parallel to an end user's session with the enterprise server.

According to some embodiments: Touch screen Device 120 may be an end-user device, used to run various Applications, for example an enterprise end user application. In some cases, a CUA module (CUAM) Software, for example Software Development Kit (SDK) 150, may be integrated directly into the customer's application or program, and may run whenever the application itself is running or when required from an application event, such as a gesture event. According to other embodiments, the CUA functionality may be executed on a touch screen device as a software service, to be used to monitor the users touch screen usage, rather than within a specific application.

The Authentication Server (e.g. CUA Server) 130 includes an incoming CUA data handler 130A which receives the touch screen usage data from the Touch screen Device 120, an end user usage library 130B which stores users profiles, an internal analysis system 130C which analyses the incoming data and the profiles to determine whether the user is who he claims to be, and a data server handler 130D which communicates the analysis results to the enterprise server 110. The Authentication Server 130 typically saves touch screen usage data for each user, and uses this data to generate at least one unique user profile or touch signature. This unique profile(s) may be modified, on the fly, as further user input or usage is tracked, to create a more accurate and updated profile(s). According to embodiments of the invention, the profile(s) may be updated by using a number of last sessions, sessions having a high enough score, sessions with a strong indication to be related to the user (e.g. accompanied by a finger print), etc. When getting new touch screen usage data for a specific user, the authentication server analyzes the data and compares the incoming data to the saved unique data for the same user, in order to validate the user's identity. Enterprise server 110, which may be any data server, typically on the cloud or on the site of an enterprise, company, organization or other entity, may include both the application executor 110A that enable typical remote usage of a remote application, as well as a security server handler 110B that communicates with the authentication server 130 in order to get substantially continuous validation data on users.

Figure 2:
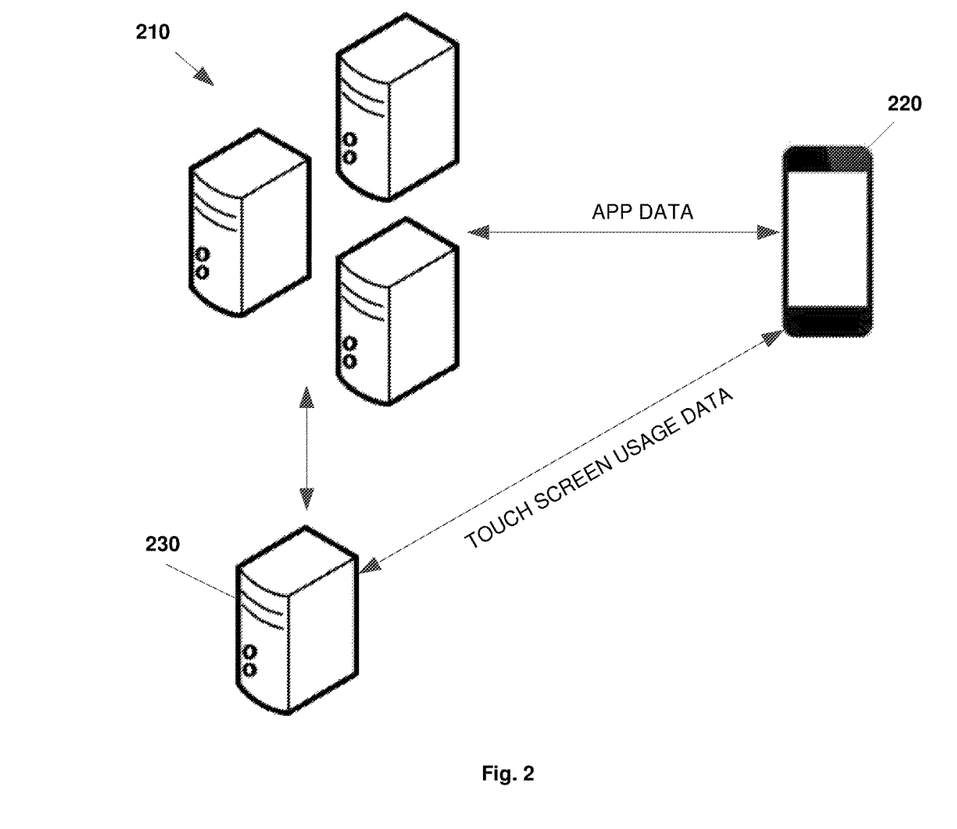
FIG. 2 is a schematic diagram showing an implementation example of the Continuous User Authentication (CUA), according to some embodiments.

FIG. 2 is a schematic diagram showing an implementation example of the Continuous User Authentication (CUA), according to some embodiments. As can be seen in the figure, an enterprise server 210, for example a bank's servers, support an Application run on a remote device 220, such as a smart phone with a touch screen, being used by an end user called John. Therefore there is a transfer of Application related data between the enterprise server 210 and the user's device 220. In parallel, the enterprise server 210, in some embodiments, may require an additional security level that identifies that John actually is John, at the time of initial user authentication with the server and/or during the user's session with the server. In parallel to the user's session with the enterprise server 210, the CUA system of the present invention opens a parallel channel in which the user's touch screen usage data is transferred to an authentication (CUA) server 230 for substantially continuous processing to determine that the user John who was initially authenticated is the same user during or throughout the session. In still further cases, even if there was no initial user identification (e.g., where the user identification will come in a later stage or will not come at all), when a sensitive transaction takes place, the CUA may use the touch screen data that was collected until that point to immediately authenticate the user. In general, the CUA server 230 may always collect touch screen data, and when the system knows who the user claims to be (either through an initial login stage or when a user enters her/his credentials at a later stage in the session), the system can start to use the data that was collected to authenticate the user.

In the above described cases, the CUA system of the present invention typically opens a parallel channel in which the user's touch screen usage data is transferred to an authentication (CUA) server for substantially continuous processing to determine that the user John is the same user during or throughout a session. In order to ensure this, the data server is in parallel communication with the authentication server, during the user's session with the data server, to be able to determine on a substantially continuous basis, that user John was and remains the same user, by verifying John's touch screen behavior during a session. In some embodiments, code lines, for example an SDK or software service, may be embedded inside a touch screen device and/or an application to facilitate the creation of the extra channel to the authentication server.

In some embodiments, the application usage data from the enterprise server combined in parallel with the touch screen data from the authentication server may enable identification of malware and/or robots attacks etc., since these attacks may be identified by their non-human behavior.

In accordance with some embodiments, the application of CUA using the CUA system may begin with a calibration process. In the calibration process, touch samples are initially collected from a specific user, by tracking user past or current usage. Following initial calibration, a validation process is executed in order to validate the user's identity. In still further embodiments, the calibration process may gather touch samples from a user that has not necessarily registered with the authentication server, for example by tracking user past or current usage. Namely, the system may create a profile(s) to be associated with the relevant user when registered with the authentication process. Following initial calibration, a validation process is executed in order to validate the user's identity.

Figure 3:
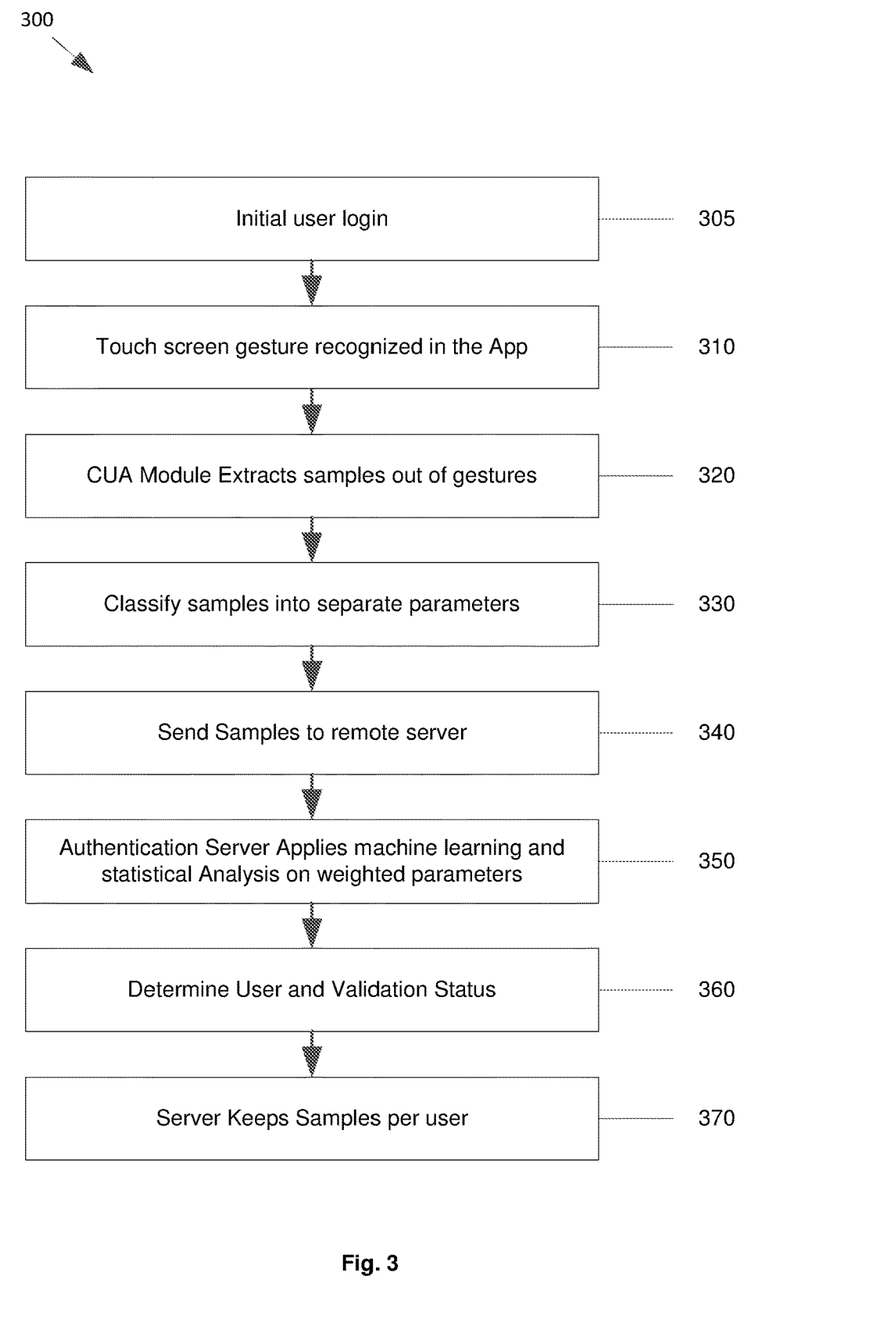
FIG. 3 is a schematic flow chart showing a series of operations or processes that may be implemented to enable Continuous User Authentication to be setup and implemented, according to some embodiments.

FIG. 3 is a schematic flow chart 300 showing a series of operations or processes that may be implemented to enable Continuous User Authentication (CUA) to be setup and implemented, according to some embodiments. As can be seen in FIG. 3, in step 305, a user of a device or an application may optionally be initially signed up, logged in and/or entered into the system. In one example, where the CUA is integrated into the device's software, the user initially registers with the CUA server. In a second example, where the CUA functionality is integrated into a device application or service, the CUA may generally be integrated into an SDK of the application, to enable CUA functionally of the application even without the user's registration with the CUA server. User sign in may use a password and/or other user verification means, including biometric verification. In step 310, during a remote user session with an enterprise server, the CUA module identifies user behaviors such as gestures on the device's touch screen, which are transmitted to the authentication server within the working context of the App that is being used. In step 320, the CUA module running on the device extracts samples out of the identified gestures, without interfering with the application's normal functionality. For example, multiple gesture types may be used to define samples with multiple parameters, as may be seen with reference to Table 1. In step 330, the samples are classified into separate parameters. For example, each sample may be added to a pre-configured parameter type (such as, double tap on the screen leads to 2 touch-size samples that are both added to the touch-size parameter). According to embodiments of the invention, the samples' extraction and\or classification may be done (or at least partially be done) in the remote server. In step 340, the authentication server sends the processed parameters/user authentication status to a remote server, for example, an enterprise server, at a selected rate or interval, according to a predetermined threshold, etc. According to embodiments of the invention, the remote server may ask the authentication server to send it the processed parameters/user authentication status. In some cases, parameters with examples of behavior by specific users may be sent to an enterprise server, to form a specific user library. In step 350, the authentication server may apply machine learning algorithms and statistical analysis on weighted parameters, for example, to further process weighted parameters from the system, to apply these to new user behavior data during a session, and thereby keep the parameters for the user, to enable generation of a user library, to better track the behavior patterns of the user of the device, for example across one or more platforms and/or applications. For example, the server runs an algorithm in order to compare between the new samples arriving in real-time and the saved samples of the same user (e.g. gathered during the calibration process). The result, in one exemplary embodiment, may be in the form of percentage, ranging from 0% (meaning the new samples and the saved samples are not of the same user) and 100% (perfect match). It will be appreciated that the result may be in any form or units and be linear, nonlinear, etc. In step 360, the authentication server may be used to determine user and validation status. In step 370 the authentication server may keep samples of user behavior, gestures etc. per user, which may function to define a user touch signature to be used to aid Continuous User Authentication.

In accordance with some embodiments, the CUA functionality on the enterprise server may include a CUA Application Programming Interface (API), which is enabled to ask for a specific user authentication status at any time during a session with a remote user. At any such time as requested, or substantially continuously if required, the authentication server replies with a user's authentication status, optionally along with relevant metadata, as described below, for example malware related data.

In accordance with some embodiments, the using of the CUA functionality is substantially invisible or non-invasive to the end user. For example, the CUA sub-module may be integrated into the customer's device or device application (s), to run automatically whenever a touch gesture is recognized when using a touch screen device with or without device application(s). Typically, the CUA module may run internally on a touch screen device or in an application, without a User Interface, such that the CUA activities are substantially invisible to the end user.

In still further embodiments the CUA module may be integrated into the user device using software (e.g. client SDK, java script for a mobile web page, etc.), allowing the CUA functionality to be integrated into an end users device application, along with code lines, with substantially no or minimal effects on the device or applications functionality.

In an additional embodiment the authentication server may be implemented on the enterprise server as an authentication module and vise versa.

According to embodiments of the invention, the CUA system may be implemented on the touch screen device. In such a case, the authentication server may be represented by an authentication module having the same capabilities as the authentication server and running on the touch screen device, and the enterprise server may be represented by a decision module which is configured to decide what to do according to the authentication module's results, for example, lock the touch screen device. In case of a desire to perform the authentication process in an offline mode, the touch screen device may store the user's profile(s). Alternatively, the device may communicate periodically, when possible, with a database storing the users' profiles.

According to some embodiments, multiple parameters related to user touch behavior are tracked/identified/collected. For example, touch pressure, finger size, touch time, time between touches, angles of touch, size of touch inputs, and many others, individually or in combination, to increase accuracy. The usage of the above examples of gestures, touches and/or touch behaviors, optionally with other biometric or security input, may generate unique user touch signatures or profiles. The enterprise server may be instructed to monitor and track these unique touch signatures to make sure the user identity is authenticated using standard usage of a remote touch device.

In still further examples of parameter usage to determine user touch behavior, user specific touch screen parameters may be extracted out of different types of touch screen gestures. In one example, a Single tap gesture may enable extraction of multiple parameters, such as tap time, tap size, and/or tap pressure. In a further example, a Fling/Scroll gesture may be defined as the type of scrolling that occurs when a user drags and lifts his/her finger quickly. After the user lifts his/her finger, the screen is still moving, but decelerates until it stops moving. Examples of parameters that may be extracted from the Fling/Scroll gesture, optionally separately for each finger and separately for each direction of movement, (i.e. Up/Down/Right/Left) may include, for example: total length of the touch area, velocity of the finger when touching the screen; slope of the touch area; end points of the touch area on every scroll/fling event within the main axis of movement; average position of the scroll/fling on the axis that is vertical to the main axis of the movement; average area of the finger that touches the screen during scroll/event; average pressure of the finger during scroll/fling event; total time the finger touched the screen during scroll/fling event; pace of scroll/fling (time between consecutive scroll/fling movements), etc.

In an additional example of parameter usage, a Double Tap gesture may define parameters such as: total time of the two taps; and time between first and second tap.

In still another example of parameter usage, a Break gesture may be defined as when the user flings/scrolls to one direction (e.g., Down), and suddenly breaks the movement with a fling/scroll in the opposite direction (e.g., Up). Out of this gesture, the system may collect parameters such as: total time the finger touches the screen in the break gesture (i.e. just the final event in the opposite direction); total distance of the touch area in the break gesture (just the final event in the opposite direction) etc.

According to some embodiments, multiple profiles or statuses may be set up for a user. For example, a user's touch behavior may be different at different times of the day or on different days, when driving, running, sleeping, changing hands, etc. The CUA system may apply specific user profiles at specific times to better match the user touch behavior, to enable user authentication per the relevant user profile(s).

According to some embodiments, in order to create multiple profiles for a user, the system may use a group of sessions, divide them into chunks of samples (or chunks of gestures), assign the chunks to clusters (for example, by K-means algorithm) and define each cluster as a profile. Alternatively or additionally, the system may use a group of sessions and assign them to different groups of sessions each representing a profile. Following, is a non limiting list of indicators, which may be used to distinguish between different profiles of a user. Each profile represents a different way of using the device.

Accelerometer—may indicate when the device is in motion or in static position.

Gyro—may indicate the angle in which the user holds the device.

OS indications for human status (e.g. running\driving\walking).

The time of day or the period of time.

The device's location during the use (e.g. using Global Positioning System (GPS)).

The finger location on the screen (e.g. different location when changing hands).

The usage context, for example, when playing a game versus when using a user interface.

According to some embodiments, the methods of chunk division may be per session, per gesture, when a significant change in one of the indicators has occurred, according to a predefined number of samples per chunk, according to a predetermined number of profiles. For example, if the number of profiles to be created is determined to be four, each gesture is associated with the relevant profile.

According to some embodiments, the system may create a "super profile" which is a thin profile comprising a minimal set of parameters that have the same or similar values in different profiles thus may provide a good indication regarding the identity of the user. The similarity may be determined, for example, according to predetermined values, using statistical calculation, etc.

During operation, the received parameters of a user's usage are compared against all the different profiles of the user. The identification score may be a combination\formula or logic based on the results of the separate scores of each profile comparison.

In some embodiments, the CUA system enables malware\bot\automated tool, etc. detection. In a first case, a malware\bot\automated tool, etc. may run on the user's touch screen device and try to impersonate touch screen gestures in order to execute actions on behalf of the legitimate user. In this case, if the user already has a profile(s), the system compares the touch behavior to this profile(s) and realizes that it is not the real user. If the user does not have a profile yet, the attempted validation process will not succeed, since the malware's\bot's\automated tool's, etc. fake touch screen gestures won't match a legitimate user's touch screen behavior. Human's gestures have a very dynamic form (for example: acceleration, velocity and angle of movement change through the gestures) unlike those of a malware/bot\automated tool's, etc. In order to keep the malware\bot\automated tool, etc. from recording the legitimate user touch screen gestures and then use these recordings to impersonate the legitimate user, the CUA system may use, for example, an anti-replay mechanism to verify that the touch screen usage data that is collected is new, real-time data and not based on the recording of old data.

The main goal of the anti-replay mechanism is to avoid hackers injecting or making changes in packets that travel from a source to a destination. Anti-replay protocol uses a unidirectional security association in order to establish a secure connection between two nodes in the network. Once a secure connection is established, the anti-replay protocol will use a sequence number or a counter. When the source sends a message, it adds a sequence number to its packet starting at 0 and increments every time it sends another message. The other end, which is the destination, receives the message and keeps a history of the number. If the next message has a lower number, the destination will drop the packet, and, if the number is larger than the previous one, it keeps and shifts it as the new number and so forth.

According to embodiments of the invention, the CUA system may detect a replay attack. An exemplary method to detect a replay attack is to store hash function result of the data that is being received in the server (either per gesture, groups\chunks of gestures or groups of sessions). Once a new data is received, it is compared to previous "hashes" of the same user in order to make sure they were not repeated (it is based on the fact that the likelihood of getting the exact same numbers from the parameters\sensors, even when it's the same user, is about zero). If the server "sees" the same numbers (same hash) it is probably a replay attack.

In another case, a malware\bot\automated tool, etc. may run on the user's touch screen device and try to make malicious actions on the user's account, without impersonating touch screen gestures. In this case, a comparison may be made between the customer's application usage data for the specific user and the records on the authentication server for the touch screen usage data (e.g. usage metadata) of the same user. If the usage data does not match (for example, if there is a lot of application usage data but no or not as much touch screen usage data) then a malware\bot\automated tool, etc. may be detected. The CUA system may detect a primitive malware\bot\automated tool, etc. by not receiving expected user parameters (e.g. touch gestures, accelerometer data, Gyro data, etc.) which cannot be impersonated by the primitive malware\bot\automated tool, etc. thus enabling to detect a malware\bot\automated tool, etc. without comparing the received data to the user's profile(s). In another case, the system may detect an advanced malware\bot\automated tool, etc., which tries to impersonated expected user parameters, by analyzing the value of each parameter. Most of the times the malware\bot\automated tool generates these parameters arbitrarily hence, the parameters will not be similar to expected ones.

In accordance with further embodiments, the above described authentication functionality may be used to secure pre-transactions, for example, verification of user identity prior to allowance of a transaction following a user login to a system. For example, continuous monitoring of user John following his initial authentication may avoid the need to re-verify his identity prior to executing a transaction. This continuous monitoring of the user's behavior may enable secure transaction verification without requiring the need for the user to re-verify his identity, whether from within an Application or within a client-server session (e.g. web application).

In accordance with a further example, when a user makes an online payment from a touch screen device (e.g. using electronic wallets, PayPal, etc.), the CUA system may identify the user without requiring the user to authenticate her/himself through password, SMS or any other authentication, whether for initial and/or periodical authentication, or authentication at the time of purchase. This approach may significantly increase conversion in and between touch screen device applications, for example in the eCommerce space, thereby aiding online payment solutions by friction reduction (less interaction with the user) as well as fraud detection.

In accordance with further embodiments, the above described authentication functionality may be adapted to be executed seamlessly to the end-user, for example, without usage of a User Interface.

In a further use case, pre-transaction authentication may be enabled, for example, where the user identity may not be known until the moment of authentication (e.g., when arriving at the payment checkout page on an mCommerce app, the user may be asked to authenticate himself, after having used the app as a guest until that point. The CUA system may in such a case collect user touch data during the guest period (for "some user") and make the validation only when the user is asked to identify himself before the payment.

In some embodiments, the CUA system authentication server may be adapted to enable cross platform authentication in accordance with continuous user touch behavior tracking For example, a user that was calibrated on one type of device can be validated on a different type of device without requiring a new calibration.

A user who already has at least one saved profile in the system may replace his device (e.g. buy a new one). Alternatively, an impersonator may try to hack a user's account by using the user's legitimate identification means (e.g. username and password) on another touch device. According to some embodiments, the system of the present invention may authenticate a user using a different device without learning his usage mode again, by at least one of the following:

1. Analyzing data received from different devices and finding parameters or combinations of parameters that do not change due to the device's type. For example, the distance of the device from the user's body or ground, the typing tempo, etc.

2. Performing normalization to a "universal device type", namely, converting parameters to the representation of the "universal device". The conversion may be based on the specification of sensors, screen size, number of pixels, the device's model, the OS version and\or type, a distribution map of the parameter among many users, etc. According to embodiments of the invention, the sensors' metadata may be sent together with the parameters or be prepared and stored in the server in advance.

3. Converting parameters based on pairs of devices or a conversion table.

4. Analyzing the user's relative use in his former device and expecting similar relative use on the new device. Relative means, the user's usage (e.g. specific touch interactions) as opposed to other users using the same device.

5. Analyzing parameters related to a specific user interface frame, area, etc. (e.g. button) and expecting to receive similar parameters related to the same frame, area, etc. in a different user interface (i.e. different device).

In some embodiments, the CUA system authentication server may be adapted to enable cross application authentication in accordance with continuous user touch behavior tracking. For example, a user who was calibrated on one type of application can be validated on a different kind of application without requiring a new calibration.

A user who already has at least one saved profile in the system may use a different application. According to some embodiments, the system of the present invention may authenticate the user using a different application without learning his usage mode again, by at least one of the following:

1. Using the existing user's profile(s).

2. Analyzing data received from the different application and finding parameters or combinations of parameters that do not change due to the application. For example, the distance of the device from the user's body or ground, the typing tempo, etc.

3. Analyzing the user's relative use in one application and expecting similar relative use in the other application. Relative means, the user's usage as opposed to other users using the same device.

4. Analyzing the parameters related to a user interface feature (e.g. a button) and expecting to receive similar parameters related to the same feature in the different user interface (i.e. different application).

According to some embodiments, the system may identify the user without any sign-in process, namely the user does not have to enter a password and/or other user verification details. According to these embodiments, the system may identify the user by, for example:

1. The device's history, namely by comparing the user's parameters to a limited group of profiles related to users that used a device having the same device ID in the past. The device's ID may be derived using known device fingerprint methods or by using an indicator (e.g. a string) stored by the system in users' devices.

2. Comparing the user's location parameter to a limited group of profiles having the same or similar location parameter.

3. Comparing the user's Wi-Fi parameter to a limited group of profiles having the same Wi-Fi parameter.

4. A unique cookie (or token or a stored piece of data) assimilated in the user's device in a former use.

It will be appreciated that the present invention is not limited to these four examples and any parameter or combinations of parameters which lead to a limited group of profiles may be used in order to identify a user.

It will be appreciated that any known in the art device fingerprint method may be used.

The one profile that has the highest score and above a predetermined threshold indicates the user's identity. Now, the system may proceed to step 310 of the authentication process described in conjunction with FIG. 3.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

TABLE 1

| # | Name | Description | Notes |
|---|------|-------------|-------|
| 0 | TAP_TIME | Total time the finger touches the screen in A tap event | Measured only on single tap events |
| 1 | TAP_SIZE | Total area of the finger that touches the screen in a tap event | Measured on each on Down event |
| 2 | TAP_PRESSURE | Finger pressure | Measured only on single tap events |
| 3 | FLING_HORIZONTAL_RIGHT_VELOCITYX | These parameters are extracted on Fling events (fling = quick scroll. See Android API). We mapped 5 different fling events: right, left, up, down, diagonal. On each fling event, we calculate the X and Y velocities and map them to these parameters, according to the current fling event direction. | Measured only when the OS decides on a fling event, rather than a scroll event |
| 4 | FLING_HORIZONTAL_RIGHT_VELOCITYY | | |
| 5 | FLING_HORIZONTAL_LEFT_VELOCITYX | | |
| 6 | FLING_HORIZONTAL_LEFT_VELOCITYY | | |
| 7 | FLING_VERTICAL_UP_VELOCITYX | | |
| 8 | FLING_VERTICAL_UP_VELOCITYY | | |
| 9 | FLING_VERTICAL_DOWN_VELOCITYX | | |
| 10 | FLING_VERTICAL_DOWN_VELOCITYY | | |
| 11 | FLING_DIAGONAL_VELOCITYX | | |
| 12 | FLING_DIAGONAL_VELOCITYY | | |
| 13 | FLING_HORIZONTAL_RIGHT_LENGTH | These parameters are extracted on Fling events as well. On each fling event, we calculate the distance of the fling in the main axis of movement (except for diagonal, when we calculate the distance for both axes) | Measured only when the OS decides on a fling event, rather than a scroll event |
| 14 | FLING_HORIZONTAL_LEFT_LENGTH | | |
| 15 | FLING_VERTICAL_RIGHT_LENGTH | | |
| 16 | FLING_VERTICAL_LEFT_LENGTH | | |
| 17 | FLING_HORIZONTAL_DIAGONAL_LENGTH | | |
| 18 | FLING_VERTI- | | |

TABLE 1-continued

| # | Name | Description | Notes |
|---|---|---|---|
|  | CAL_DIAGONAL_LENGTH |  |  |
| 19 | SCROLL_SIZE | This parameter is not in use |  |
| 20 | SCROLL_PRESSURE | Average finger pressure during a scroll event | Measured only when the OS decides on a scroll event, rather than a fling event |
| 21 | DOUBLE_TAP_TIME_GAP | Total time between start of first tap to end of second tap |  |
| 22 | SCROLLDISTANCERIGHTXLIST | These parameters are extracted on Scroll events. We mapped 4 different scroll events: right, left, up, down. Each scroll event is comprised out of multiple on Scroll events one after the other. On each scroll event, we calculate the average X and Y distances between 2 adjacent on Scroll events, during an entire scroll event. We map them to these parameters, according to the current scroll event direction. | Measured only when the OS decides on a scroll event, rather than a fling event |
| 23 | SCROLLDISTANCERIGHTYLIST |  |  |
| 24 | SCROLLDISTANCELEFTXLIST |  |  |
| 25 | SCROLLDISTANCELEFTYLIST |  |  |
| 26 | SCROLLDISTANCEUPXLIST |  |  |
| 27 | SCROLLDISTANCEUPYLIST |  |  |
| 28 | SCROLLDISTANCEDOWNXLIST |  |  |
| 29 | SCROLLDISTANCEDOWNYLIST |  |  |
| 30 | SCROLLTIMERIGHT | Total time the finger touches the screen during a scroll event, according to the scroll direction | Measured only when the OS decides on a scroll event, rather than a fling event |
| 31 | SCROLLTIMELEFT |  |  |
| 32 | SCROLLTIMEUP |  |  |
| 33 | SCROLLTIMEDOWN |  |  |
| 34 | POSITIONX | Horizontal position of the current touch gesture from the closer edge of the device | Parameter 34 is with differentiation between left and right: If the position of the gesture is closer to the right edge of the device, then the number 1000 is added to the sample (so right hand people will be differentiated from left hand people) Parameter 35 doesn't distinguish between left hand and right hand people, so a gesture with a distance X from the right edge of the device, and a gesture with distance X from the left edge of the device will have the same sample |
| 35 | POSITIONX2 |  |  |
| 36 | BREAK_DISTANCE_DOWN | Break event is every time a user make 3 consecutives scroll or fling movements in the same direction and then a movement in as the other direction. Once that happens, the distance and time of that other direction movement is calculated. These are only for up and down movements (meaning a user scrolls/flings up 3 or more time in a row and then scrolls/flings down or vice versa | There are constants inside the code to decide what counts as consecutive movements (how much time passes between each 2 consecutive movements) |
| 37 | BREAK_TIME_DOWN |  |  |
| 38 | BREAK_DISTANCE_UP |  |  |
| 39 | BREAK_TIME_UP |  |  |
| 40 | SLOPERIGHT | Slope of scroll events. Measured as the slope between the first and last touch events of a single scroll event | Measured only when the OS decides on a scroll event, rather than a fling event |
| 41 | SLOPELEFT |  |  |
| 42 | SLOPEUP |  |  |
| 43 | SLOPEDOWN |  |  |
| 44 | SCROLLPACERIGHT | Time between consecutive scrolls or flings when there are at least 3 in a row | Measured for both scrolls and flings. There are constants inside the code to decide what counts as consecutive movements (how much time passes between each 2 consecutive movements) |
| 45 | SCROLLPACELEFT |  |  |
| 46 | SCROLLPACEUP |  |  |
| 47 | SCROLLPACEDOWN |  |  |
| 48 | FLING_RIGHT_TIME | Total time the finger touches the screen during a fling event | Measured only when the OS decides on a fling event, rather than a scroll event |
| 49 | FLING_LEFT_TIME |  |  |
| 50 | FLING_UP_TIME |  |  |
| 51 | FLING_DOWN_TIME |  |  |
| 52 | FLING_DIAGONAL_TIME |  |  |
| 53 | FLING_RIGHT_DISTANCE | Total distance, velocity and slope of fling events (different from parameters 3-18) | Measured only when the OS decides on a fling event, rather than a scroll event |
| 54 | FLING_RIGHT_VELOCITY |  |  |
| 55 | FLING_RIGHT_SLOPE |  |  |
| 56 | FLING_LEFT_DISTANCE |  |  |
| 57 | FLING_LEFT_VELOCITY |  |  |
| 58 | FLING_LEFT_SLOPE |  |  |
| 59 | FLING_UP_DISTANCE |  |  |
| 60 | FLING_UP_VELOCITY |  |  |
| 61 | FLING_UP_SLOPE |  |  |
| 62 | FLING_DOWN_DISTANCE |  |  |
| 63 | FLING_DOWN_VELOCITY |  |  |
| 64 | FLING_DOWN_SLOPE |  |  |
| 65 | FLING_PRESSURE | Finger pressure | Measured only when the OS decides on a fling event, rather than a scroll event |
| 66 | SCROLL_UP_SIZE | Area of the touch area, separated between ups and downs (not separated for scrolls and flings) | Measured for both scrolls and flings |
| 67 | SCROLL_DOWN_SIZE |  |  |
| 68 | FLING_UP_MAX_Y | End points of each fling event (according to the direction of the fling) | Measured only When the OS decides on a fling event, rather than a scroll event |
| 69 | FLING_UP_MIN_Y |  |  |
| 70 | FLING_DOWN_MAX_Y |  |  |
| 71 | FLING_DOWN_MIN_Y |  |  |
| 72 | FLING_RIGHT_MAX_X |  |  |
| 73 | FLING_RIGHT_MIN_X |  |  |
| 74 | FLING_LEFT_MAX_X |  |  |
| 75 | FLING_LEFT_MIN_X |  |  |

TABLE 1-continued

| # | Name | Description | Notes |
|---|------|-------------|-------|
| 76 | FLING_RIGHT_AVG_Y | Avg position of fling event on the axis that is not the main axis of the event | Measured only when the OS decides on a fling event, rather than a scroll event |
| 77 | FLING_LEFT_AVG_Y | | |
| 78 | FLING_UP_AVG_X | | |
| 79 | FLING_DOWN_AVG_X | | |

The invention claimed is:

1. A cross platform user authentication system, comprising:
   an authentication server;
   an enterprise server; and
   a second touch screen device configured to communicate with said enterprise server and said authentication server;
   said system configured to generate at least one unique user profile during user contact with a touch screen of a first touch screen device;
   said at least one unique user profile comprising at least touch parameters;
   said authentication server configured to communicate with said enterprise server;
   said system configured to perform:
      initial identification of said user using said second touch screen device when starting a session with said enterprise server; and
      continuous cross platform authentication of said user during contact with a touch screen of said second touch screen device during said session with said enterprise server, according to said at least one unique user profile generated while said user has been using said first touch screen device;
   wherein said first touch screen device is different from said second touch screen device and wherein the authentication of said user of said second touch screen device occurs without requiring a new calibration on said second touch screen device.

2. The system of claim 1, further configured to compare said at least one unique user profile with a behavior of said user when starting said session with said enterprise server.

3. The system of claim 1, further configured to compare said at least one unique user profile with a behavior of said user during said session with said enterprise server.

4. The system of claim 1, further configured to continuously update said at least one unique user profile during a session of said first touch screen device with said enterprise server.

5. The system of claim 1, wherein said at least one unique user profile comprises a plurality of unique user profiles; said system configured to generate said plurality of unique user profiles using various indications.

6. The system of claim 5, wherein said various indications are derived using at least one of: accelerometer, gyro, Global Positioning System (GPS), finger location and usage context.

7. The system of claim 5, further configured to generate a super profile using common indications included in each of said plurality of unique user profiles.

8. The system of claim 1, wherein said system is configured to detect an automated tool trying to impersonate touch screen behavior.

9. The system of claim 8, wherein said system comprises an anti replay mechanism configured to perform said detection.

10. The system of claim 8, wherein said system is configured to perform said detection by comparing said user's behavior to at least one hash calculated from previous behaviors of said user.

11. The system of claim 8, wherein said system is configured to perform said detection by one of not receiving expected parameters and not receiving expected parameters values.

12. The system of claim 1, wherein said authentication server comprises:
   an incoming data handler configured to receive behavior of said user of said first and second touch screen devices;
   a user usage library configured to store users profiles;
   an analysis system configured to analyze said behavior and at least one profile to authenticate said user; and
   a data server handler configured to communicate results of said analysis system to said enterprise server.

13. The system of claim 1, wherein said system is configured to perform said initial identification by comparing a behavior of said user of said second touch screen device to a limited group of profiles related to users that used a touch screen device having the same device ID in the past.

14. The system of claim 1, wherein said system is configured to perform said initial identification by comparing a location parameter of said user of said second touch screen device to a limited group of profiles having the same or similar location parameter.

15. The system of claim 1, wherein said system is configured to perform said initial identification by comparing a wireless communication parameter of said user of said second touch screen device to a limited group of profiles having the same or similar wireless communication parameter.

16. The system of claim 1, wherein said system is configured to perform said initial identification using a unique piece of data assimilated in said second touch screen device in a former use.

17. The system of claim 1, wherein said authentication server is configured to enable pre-transaction authentication, without a specific authentication action by said user, in accordance with continuous user behavior tracking.

18. The system of claim 1, wherein said system is configured to execute said continuous authentication seamlessly to said user.

19. The system of claim 1, wherein said system is configured to perform said cross platform authentication by analyzing common parameters collected from at least said first touch screen device of said user and said second touch screen device of said user.

20. The system of claim 1, wherein said system is configured to perform said cross platform authentication by normalizing parameters collected from at least two touch screen devices of said user to a universal device's parameters.

21. The system of claim 1, wherein said system is configured to perform said cross platform authentication by analyzing relative behavior of said user on said first touch screen device and expecting similar relative behavior of said user on said second touch screen device.

22. The system of claim 1, wherein said system is configured to perform said cross platform authentication by analyzing a specific user interface frame on said first touch screen device and expecting similar parameters related to the same frame in said second touch screen device.

23. A method of enabling continuous cross platform user authentication, comprising:

setting up an authentication server to provide authentication data to an enterprise server in parallel to a remote user session with said enterprise server, when said user is using a touch screen device;

extracting samples from a user's behavior on a touch screen of a first touch screen device, to generate at least one unique user profile; said at least one unique user profile comprising at least touch parameters; and tracking user behavior on a touch screen of a second touch screen device to authenticate said user, said tracking comprises:

initial identification of said user using said second touch screen device when starting a session with said enterprise server; and     continuous authentication of said user during contact with said touch screen of said second touch screen device during said session with said enterprise server, according to said at least one unique user profile generated while said user has been using said first touch screen device;

wherein said first touch screen device is different from said second touch screen device and wherein the authentication of said user of said second touch screen device occurs without requiring a new calibration on said second touch screen device.

24. The method of claim 23, wherein said initial identification comprises comparing said behavior on said second touch screen device with said at least one unique profile of said user when starting a session with said enterprise server.

25. The method of claim 23, wherein said continuous authentication comprises comparing said behavior on said second touch screen device with said at least one unique profile of said user during a session with said enterprise server.

26. The method of claim 23, further comprising detecting an automated tool trying to impersonate touch screen behavior.

27. The method of claim 26, wherein said detection is done using an anti replay mechanism.

28. The method of claim 26, wherein said detection comprises comparing said user's behavior to at least one hash calculated from previous behaviors of said user.

29. The method of claim 26, wherein said detection comprises one of not receiving expected parameters and not receiving expected parameters values.

30. The method of claim 23, wherein said initial identification comprises comparing a behavior of said user of said second touch screen device to a limited group of profiles related to users that used a touch screen device having the same device ID in the past.

31. The method of claim 23, wherein said initial identification comprises comparing a location parameter of said user of said second touch screen device to a limited group of profiles having the same or similar location parameter.

32. The method of claim 23, wherein said initial identification comprises comparing a wireless communication parameter of said user of said second touch screen device to a limited group of profiles having the same or similar wireless communication parameter.

33. The method of claim 23, wherein said initial identification comprises using a unique piece of data assimilated in said second touch screen device in a former use.

34. The method of claim 23, further comprising performing a pre-transaction authentication, without a specific authentication action by said user, in accordance with continuous user behavior tracking.

35. The method of claim 23, wherein said method is configured to execute said continuous authentication seamlessly to said user.

36. The method of claim 23, wherein performing said cross platform authentication comprises analyzing common parameters collected from at least said first touch screen device of said user and said second touch screen device of said user.

37. The method of claim 23, wherein performing said cross platform authentication comprises normalizing parameters collected from at least two touch screen devices of said user to a universal device's parameters.

38. The method of claim 23, wherein performing said cross platform authentication comprises analyzing relative behavior of said user on said first touch screen device and expecting similar relative behavior of said user on said second touch screen device.

39. The method of claim 23, wherein performing said cross platform authentication comprises analyzing a specific user interface frame on said first touch screen device and expecting similar parameters related to the same frame in said second touch screen device.

40. A cross application user authentication system, comprising:

an authentication server;

an enterprise server; and a touch screen device running a first application; said touch screen device configured to communicate with said enterprise server and said authentication server;

said system configured to generate at least one unique user profile during user contact with a touch screen of said touch screen device during use of said first application;

said at least one unique user profile comprising at least touch parameters;

said authentication server configured to communicate with said enterprise server;

said system configured to perform:

initial identification of said user of said touch screen device using a second application when starting a session with said enterprise server; and     continuous cross application authentication of said user during contact with a second touch screen of a second touch screen device during use of said second application during said session with said enterprise server, according to said at least one unique user profile generated while said user has been using said first application;

wherein said first application is different from said second application and wherein the authentication of said user of said second application occurs without requiring a new calibration on said second touch screen device.

41. A method of enabling continuous cross application user authentication, comprising:

setting up an authentication server to provide authentication data to an enterprise server in parallel to a remote user session with said enterprise server, when a user is using a touch screen device;

extracting samples from said user's touch behavior during use of a first application running on said touch screen device, to generate at least one unique user profile; said at least one unique user profile comprising at least touch parameters; and tracking user behavior on a second application running on said touch screen device to authenticate said user, said tracking comprises:

initial identification of said user using said second application when starting a session with said enterprise server; and continuous authentication of said user based on the user's contact with a touch screen of a second touch screen device during use of said second application during said session with said enterprise server, according to said at least one unique user profile generated while said user has been using said first application;

wherein said first application is different from said second application and wherein the authentication of said user of said second application occurs without requiring a new calibration on said second touch screen device.

42. The system of claim 40, wherein said continuous cross application authentication comprises analyzing common parameters collected from at least said first application used by said user and said second application used by said user.

43. The system of claim 40, wherein said continuous cross application authentication comprises analyzing said user's relative use in said first application and expecting similar relative use in said second application.

44. The system of claim 40, wherein said continuous cross application authentication comprises analyzing a specific user interface feature on said first application and expecting similar parameters related to the same feature in said second application.

45. The method of claim 41, wherein said continuous authentication comprises analyzing common parameters collected from at least said first application used by said user and said second application used by said user.

46. The method of claim 41, wherein said continuous authentication comprises analyzing said user's relative use in said first application and expecting similar relative use in said second application.

47. The method of claim 41, wherein said continuous authentication comprises analyzing a specific user interface feature on said first application and expecting similar parameters related to the same feature in said second application.

* * * * *